United States Patent [19]
Rozmaryn

[11] Patent Number: 6,128,494
[45] Date of Patent: Oct. 3, 2000

[54] SIGNAL TO NOISE AND INTERFACE ESTIMATOR FOR ANALOG VOICE CHANNEL

[75] Inventor: Jacob Rozmaryn, Silver Spring, Md.

[73] Assignee: Hughes Electronics Corporation, El Segundo, Calif.

[21] Appl. No.: 08/990,384

[22] Filed: Dec. 15, 1997

[51] Int. Cl.[7] .................................................. H04B 17/00

[52] U.S. Cl. ..................... 455/436; 455/67.6; 455/226.3; 375/227; 375/371

[58] Field of Search ............................ 455/422, 63, 67.1, 455/67.6, 226.1–226.3, 296, 303–304, 436–438, 442–444; 375/227, 371

[56] References Cited

U.S. PATENT DOCUMENTS

| | | | |
|---|---|---|---|
| 4,412,299 | 10/1983 | Huffman | 375/371 |
| 4,688,234 | 8/1987 | Robinton | 375/227 |
| 5,214,687 | 5/1993 | Kansakoski et al. | 455/437 |

*Primary Examiner*—Doris H. To
*Attorney, Agent, or Firm*—John T. Whelan; Michael W. Sales

[57] ABSTRACT

The residual phase deviation of the supervisory audio tone (SAT) and/or signaling tone (ST) signal in an analog voice channel cellular communication system is used to estimate the underlying signal-to-noise ratio (SNR) and signal-to-interference ratio (SIR). The phase deviation is estimated using a two-stage autoregressive filter/variance estimator, which may be implemented in firmware in a digital signal processor.

24 Claims, 3 Drawing Sheets

SIGNAL TO NOISE AND INTERFACE ESTIMATOR FOR ANALOG VOICE CHANNEL

BACKGROUND OF THE INVENTION

1. Field of the Invention

The present invention relates to cellular communication systems and, more particularly, to estimating the underlying signal-to-noise ratio and signal-to-interference ratio in a cellular communication system.

2. Description of Related Art

A simplified block diagram of a cellular communication system 10 is shown in FIG. 1. The cellular communication system 10 may be, for example, an IS-54 system. The cellular communication system 10 includes a plurality of base stations 12 used for radio communication with a number of cellular or mobile units 14. The mobile units 14 may be, for example, cellular phones mounted in an automobile, portable hand-held phones, or any other mobile communication devices. Alternatively, the base stations 12 may communicate with a multi-subscriber unit (MSU), such as a residential complex, hotel or office building.

Each base station 12 comprises several transmitters and receivers which simultaneously handle full duplex communications and each is generally located at the center or edge of a geographic coverage region (called a cell). As the mobile units move between cells, the calls are switched or "handed-off" to the appropriate base station.

The base stations 12 are connected (via, for example, telephone lines or microwave links) to a mobile switching center (MSC) 16, which coordinates the routing of all calls in a large geographic service area. The MSC 16 links the base stations 12 and the mobile units 14 to a public switched telephone network (PSTN) 18 and/or another MSC 20.

Communication between a base station 12 and a mobile unit 14 is made via four channels:

(1) Forward Voice Channel (FVC)—voice transmission from base stations to mobile units;

(2) Reverse Voice Channel (RVC)—voice transmission from mobile units to base stations;

(3 & 4) Forward Control Channel (FCC) & Reverse Control Channel (RCC)—for initiating and setting up calls.

Two signals are transmitted on the voice channels along with the voice signals:

(1) Supervisory Audio Tone (SAT): The SAT is one of three tones in the 6 KHz frequency region (5.97 KHz, 6.00 KHz or 6.03 KHz in an AMPS or ETACS system) that is generated and transmitted by a base station on the FVC during a call. The particular frequency of the SAT denotes the particular base station location for a given channel and is assigned by the MSC 16 for each call. The SAT indicates the presence of a mobile call and remains on the entire time the call is in progress.

When a call is set up and a voice channel assignment is issued, the base station 12 immediately begins transmission of the SAT on the FVC by superimposing the SAT on the voice signal. As the mobile unit 14 monitors the FVC, it detects, filters and demodulates the SAT coming from the base station 12 and then reproduces the same tone for continuous transmission back to the base station 12 on the RVC. If the SAT is not present or is improperly detected, both the base station 12 and the mobile unit 14 cease transmission and the MSC 16 uses the vacated channel for new calls.

(2) Signaling Tone (ST): The ST is a 10 KHz data burst which is transmitted by the mobile unit 14 to the base station 12 on the RVC to (a) confirm alert orders sent by the base station 12 that indicate a call to the mobile unit 14, (b) flash for additional services, and (c) notify the base station 12 that the mobile unit 14 has released or terminated the call. The ST is sent simultaneously with the SAT.

The SAT and ST signals will be referred to herein as "tone signals."

In cellular communications systems, it is desirable to know how much noise and/or interference is present in the system. Generally, the noise/interference is measured as a ratio to the signal rate—the signal-to-noise ratio (SNR) and signal-to-interference (SIR) ratio. (The SNR and SIR will be referred to as "noise/interference ratios".) The noise/interference ratios are monitored such that when a ratio is too low for a particular call, the call can be handed off to a different cell. However, if it takes too long to determine the noise/interference ratio, the call may be dropped before the hand-off can occur. Therefore, there remains a need for a system for quickly and accurately estimating the noise/interference ratio in a cellular communication system.

SUMMARY OF THE INVENTION

The present invention computes the residual phase deviation of the supervisory audio tone (SAT) and/or signaling tone (ST) signal in an analog voice channel cellular communication system to estimate the underlying signal-to-noise ratio and/or signal-to-interference ratio using an autoregressive filter/variance estimator.

According to one aspect of the present invention, a method of estimating the noise/interference ratio in a cellular communication system comprises the steps of: (a) calculating the phase differential of a tone signal in a voice channel; (b) calculating the phase deviation of the tone signal; and (c) estimating the noise/interference ratio based on the phase deviation of the tone signal.

In a preferred embodiment of the invention, the step of calculating the phase differential of the tone signal further comprises determining a phase angle of the tone signal at a first and second time period, unwrapping the phase angle and computing a phase difference between the phase angle at the first time period and the phase angle at the second time period. The step of calculating the phase deviation of the tone signal is implemented by a two-stage autoregressive filter, which comprises a residual phase filter and a residual phase deviation filter. The phase deviation of the tone signal is calculating by weighing a previous estimate of a phase mean, weighing a current value of the phase differential and calculating a new estimate of the phase mean based on the weighted values.

Also according to a preferred embodiment, the previous estimate of the phase mean is weighted by a constant ($\alpha$) and the current value of the phase differential is weighted by $1-\alpha$, wherein the constant $\alpha$ is a power of 2.

According to another aspect of the present invention, an apparatus for calculating the residual phase deviation of a tone signal in an analog voice channel comprises means for determining a phase differential of the tone signal and a two-stage autoregressive filter coupled to the output of the phase differential determining means. The autoregressive filter calculates a residual phase deviation of the tone signal by weighing a current value of the phase differential and a previous estimate of a phase mean and the residual phase deviation is used to estimate a noise/interference ratio.

In a preferred embodiment of the invention, the phase differential determining means comprises an arctangent operator and a phase unwrap and differencer. Also, the tone signal may be a supervisory audio tone (SAT) signal or a signaling tone (ST) signal. Further, the noise/interference ratio is a signal-to-noise ratio (SNR) or a signal-to-interference ratio (SIR).

BRIEF DESCRIPTION OF THE DRAWING(S)

DESCRIPTION OF THE PREFERRED EMBODIMENT(S)

Figure 1:
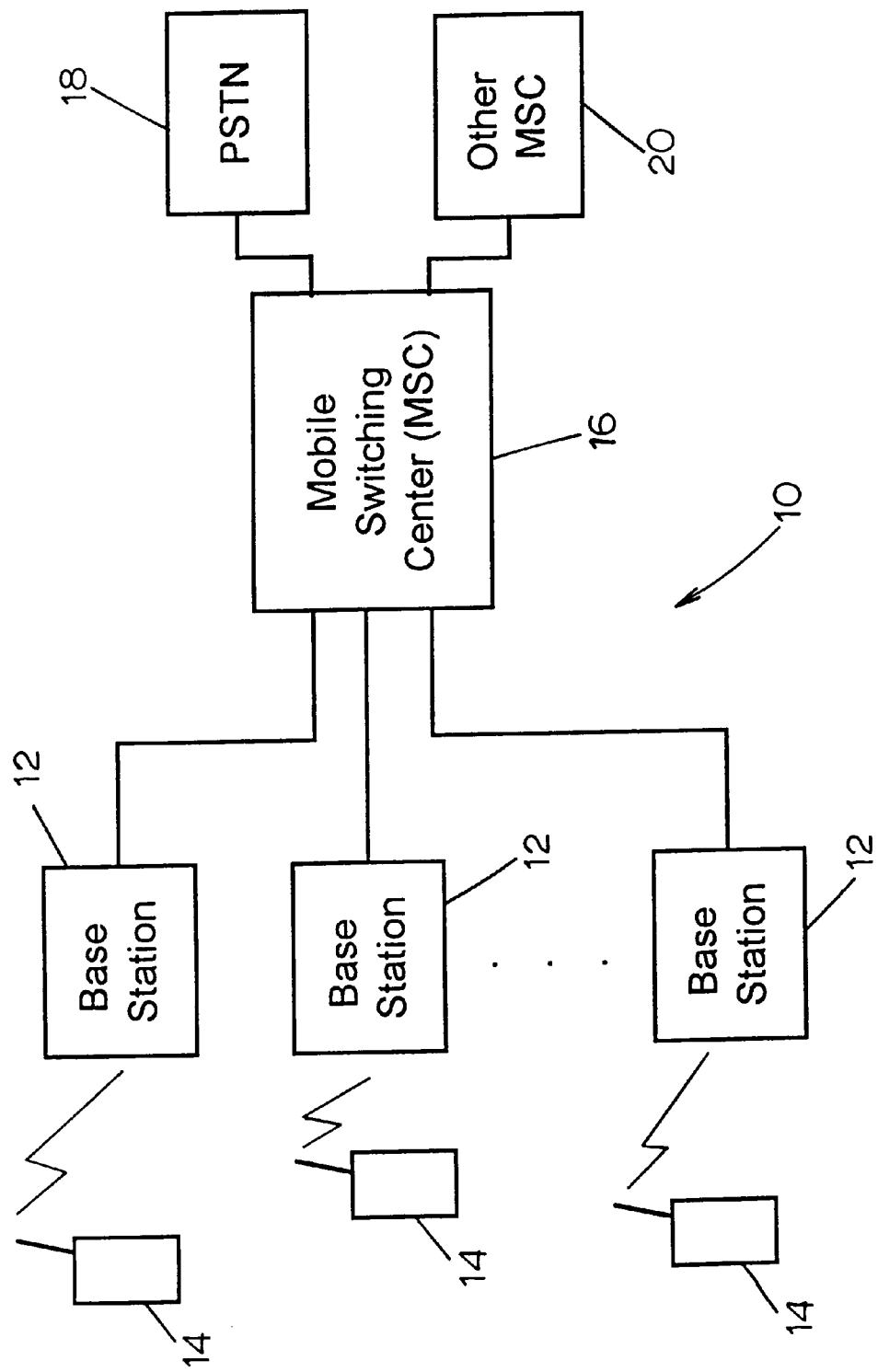
FIG. 1 is a simplified block diagram of a cellular communication system.

The present invention is a system for estimating the signal-to-noise ratio (SNR) and signal-to-interference ratio (SIR) in a cellular communication system, based on the residual phase deviation of a tone signal (SAT or ST) in the voice channel. The SNR and SIR estimate is useful in many aspects of the cellular communication system. For example, the estimate may be used in hand-off determinations. By continually monitoring the background noise and interference levels of a connected mobile unit call, the call can be handed off and a new channel can be selected to reduce call interference and prevent accidentally dropped calls. The SNR and SIR estimate allows hand offs to be made before the noise and interference reach a level which disrupts a call.

The SNR and SNI estimates calculated by the present invention can also be used in mobile power control. For example, in some communication systems, the uplink mobile power is controlled by a channel unit in the base station by adjusting the mobile attenuation level. This adjustment is generally based solely on signal power. More efficient system power management performance can be achieved if the mobile power control is based on the SNR and SIR levels. This would allow mobile attenuations to be increased, resulting in lower power transmission and reduced interference with other mobile units.

The present invention may also be used to estimate the SNR and SIR to eliminate false call releases. During high interference periods, call releases generated by interfering mobile units can cause false detection of call releases by other mobile units, resulting in accidentally dropped calls. Matching ST call releases with signal-to-interference ratio estimates of both the ST and the SAT can eliminate false call release detections by the base stations.

Further, monitoring residual SAT phase variance of idle channels and selecting channels with a minimum phase SAT variance for allocation will decrease adjacent and co-channel interference on newly connected calls.

It has been determined that for large signal-to-noise ratios, the phase error standard deviation of the SAT or ST tones is inversely proportional to the square root of the underlying signal-to-noise ratio, as shown in Equation 1 below. Therefore, the phase error deviation can be used as a reliable indicator of the signal-to-noise ratio.

$$\sigma_{phase} = \frac{180}{\pi\sqrt{r}\,\beta\sqrt{(snr)}};\qquad\text{Eq. 1}$$

where,
r=ratio of IF to baseband bandwidths;
β=FM modulation index of the SAT.

An exemplary linear equation relating the phase standard deviations of the SAT and ST tones and the signal-to-noise ratios for a particular cellular communication system are tabulated in Table 1, below, wherein the phase deviation is calculated from Eq. 1.

TABLE 1

|  | SAT | ST |
| --- | --- | --- |
| β | 1/3 | .8 |
| r | 140 | 140 |
| $\sigma_{phase}$ (from Eq. 1) | $\frac{14.54}{\sqrt{(snr)}}$ degree; | $\frac{6.07}{\sqrt{(snr)}}$ degree; |
| $\sigma_{dB\_deg\,phase}$ | 23.25-$SNR_{dB}$ | 15.7-$SNR_{dB}$ |

The equations above are valid for signal-to-noise ratios greater than 8 dB. For signal-to-noise ratios less than 8 dB, the relationship between the SNR and the phase standard deviation can be empirically derived. For example, an optimal estimator filter can be derived for extraction of the phase standard deviation. Such filter, however, would not track abrupt changes in phase deviations.

Figure 2:
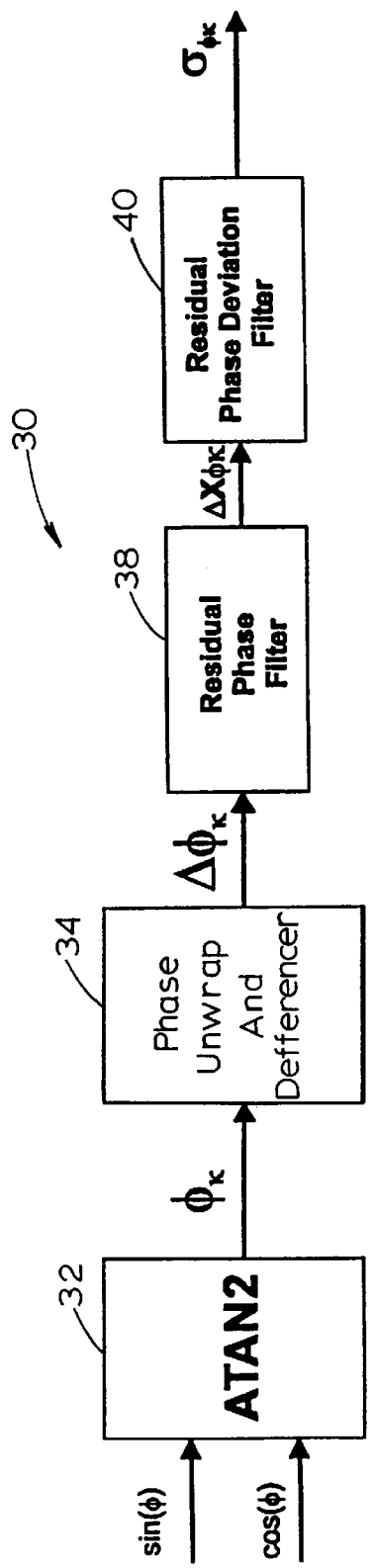
FIG. 2 is a block diagram of a two stage autoregressive (AR) filter of the present invention for performing phase deviation estimation.

Thus, in accordance with the present invention, the estimation is preferably implemented by a two stage autoregressive (AR) filter that tracks changes in the phase deviations, yet requires fewer mathematical operations than a conventional optimal estimator. A block diagram of a two stage AR filter 30 of the present invention is shown in FIG. 2. Referring to FIG. 2, the sine and cosine correlators of the tone signal (sin(φ) and cos(φ)) are applied to a four-quadrant arctangent (ATAN2) operator 32, resulting in the phase angle of the received tone signal at time k ($\phi_k$). The phase angle $\phi_k$ is then applied to the phase unwrap and differencer 34 which determines the phase differential ($\Delta\phi_k$).

Figure 3:
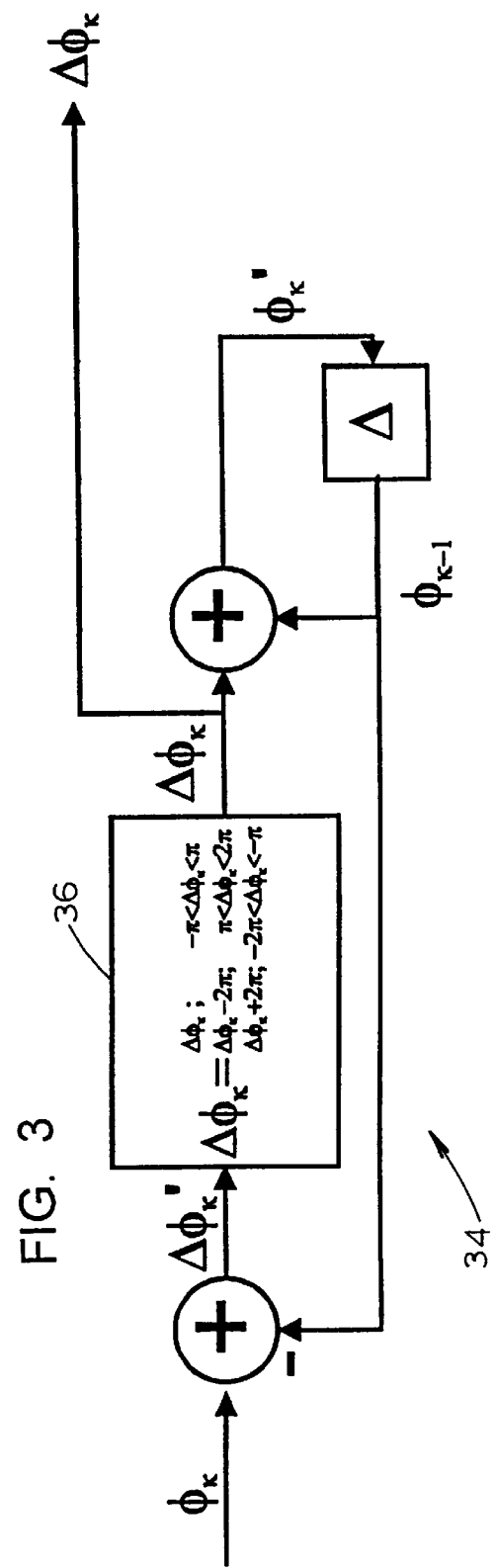
FIG. 3 is a block diagram of the phase unwrap and differencer of the AR filter of FIG. 2.

The phase unwrap and differencer 34 is illustrated in detail in FIG. 3. Referring to FIG. 3, the previous phase angle ($\phi_{k-1}$) is subtracted from the current phase angle ($\phi_k$) to determine the phase differential ($\Delta\phi_k$), wherein the time difference between k and k−1 represents a delay of one sample unit (Δ). The absolute or unadjusted difference between the current phase angle and the previous phase angle is represented by $\Delta\phi_k'$. This value is then adjusted or "unwrapped" by the block 36, which adjusts the differential to be between −π and π, regardless of the value. Thus, the block 36 calculates $\Delta\phi_k$ according to the following equation:

$$\begin{aligned}\Delta\phi_k &= \Delta\phi_k' &&\text{if } -\pi < \Delta\phi_k' < \pi\\&= \Delta\phi_k' - 2\pi &&\text{if } \pi < \Delta\phi_k' < 2\pi\\&= \Delta\phi_k' + 2\pi &&\text{if } -2\pi < \Delta\phi_k' < -\pi\end{aligned}\qquad\text{Eq. 2}$$

Figure 4:
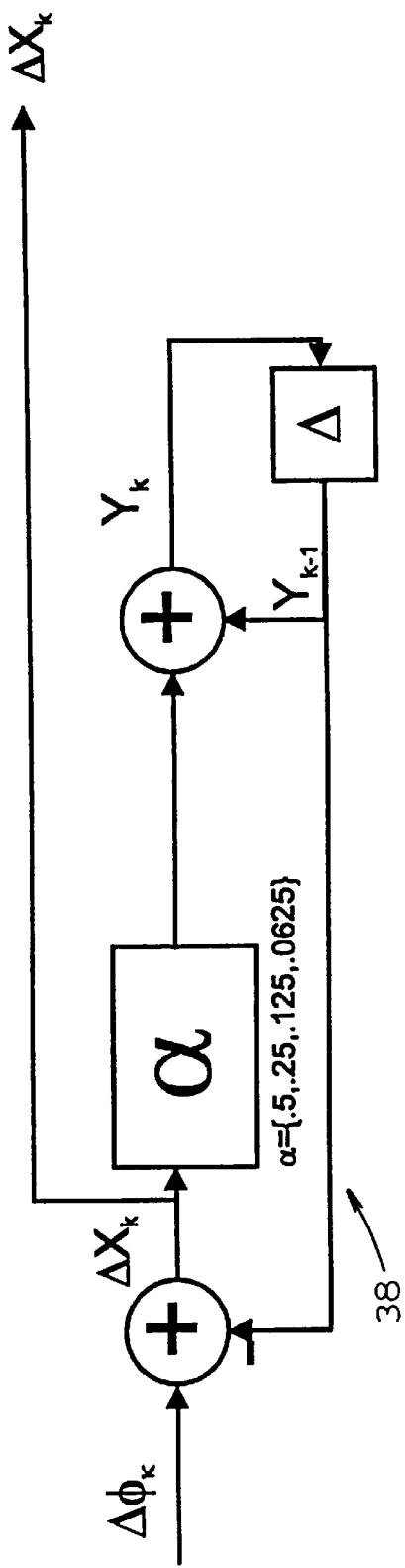
FIG. 4 is the residual phase filter of the AR filter of FIG. 2.
Figure 5:
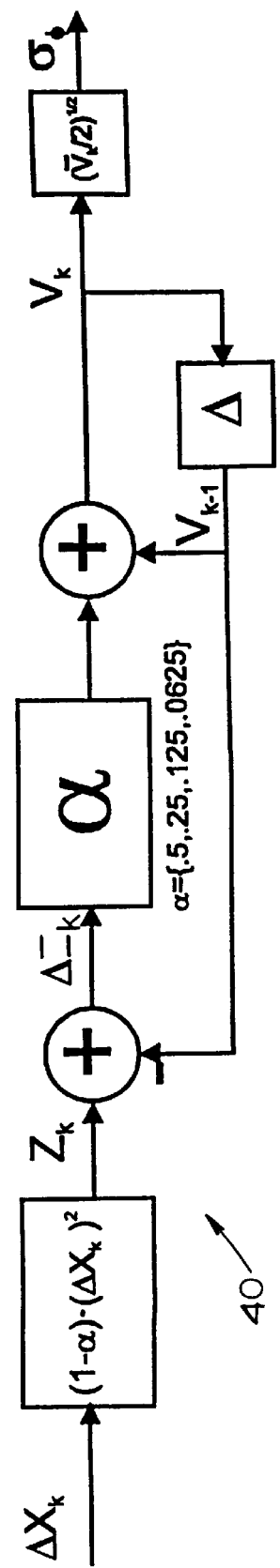
FIG. 5 is the residual phase deviation filter of the AR filter of FIG. 2.

Referring back to FIG. 2, the phase differential $\Delta\phi_k$ output from the phase unwrap and differencer 34 is provided to a residual phase filter 38, which is illustrated in detail in FIG. 4. The residual phase filter 38 is the first stage of the two-stage AR filter 30. The residual phase filter 38 filters and tracks the means of the phase differentials, according to the following equations:

$$Y_k = \alpha \Delta X_k + Y_{k-1};\quad\text{Eq. 3}$$

with $$\Delta X_k = \Delta\phi_k - Y_{k-1};\quad\text{Eq. 4}$$

where, $Y_k$=estimate of phase mean at time k $\alpha$=AR filter coefficient $\Delta X_k$=difference between current phase differential and phase mean estimate Thus, the output of the residual phase filter ($\Delta X_k$) is the difference between the current phase differential ($\Delta\phi_k$) and an estimate of the phase mean at time k ($Y_k$). This output is provided to a residual phase deviation filter 40, which comprises the second stage of the two-stage AR filter 30 and is illustrated in detail in FIG. 5.

The deviation or residual phase deviation filter 40 tracks the phase variance ($\sigma_{\phi k}$) according to the following equations:

$$Z_k = (1-\alpha)\cdot\Delta X_k^2;\quad\text{Eq. 5}$$

$$V_k = \alpha \Delta Z_k + V_{k-1};\quad\text{Eq. 6}$$

with $$\Delta Z_k = Z_{k-V_{k-1}};\quad\text{Eq. 7}$$

$$\sigma_{\phi k} = \sqrt{\frac{V_k}{2}}\quad\text{Eq. 8}$$

where $\Delta Z$=difference between current Z and phase variance

Thus, the AR filter 30 estimates the phase deviation by weighing the previous estimate by a constant ($\alpha$) and then weighing the current phase differential value by ($1-\alpha$). The coefficient $\alpha$ controls the weighing of previous estimates of the phase mean and variance and, thereby, limits the effective number of previous samples being processed.

The value of $\alpha$ is set based upon the amount of filtering and the processing speed $\alpha$ may be set to various values (0.5, 0.25, 0.125, 0.0625, etc.); however, setting $\alpha$ to values that are powers of 2 reduces processing complexity. A large $\alpha$ value places more weight on the previous estimate and more accurately filters out sudden changes in the new value of the phase differential. However, the implemention takes longer. For smaller $\alpha$ values, the filter is not as fine and more susceptible to noise but the implementation is quicker.

The AR filter 30 of the present invention is sensitive to variations in SAT and ST frequencies (which are nominally set at one of 5.97, 6.00 or 6.04 KHz for SAT and 10 KHz for ST). Any deviation from these assigned frequencies will result in a linear phase drift. To avoid the phase drifting and sensitivity to SAT and ST frequency variations, the input phases to the residual phase filter 38 and the residual phase deviation filter 40 are differenced. Thus, any constant frequency shift will translate to constant phase difference bias and will not affect the phase variance and standard deviation estimation.

While either the SAT or the ST signals may be used as inputs to the AR filter 30 of the present invention, the SAT signal is preferably used because the SAT signal is always present throughout the duration of a call.

Preferably, the AR filter 30 of the present invention is implemented in firmware in a digital signal processor (DSP). The code for implementing the AR filter 30 of the present invention (which is written, for example, in the Matlab language) is as follows:

```
del_st phase=diff(st_phase);
mean_x_st=del_st_phase(1);
var_x_st=0;
for i=2:length(del_st_phase)
    del_x_st=del_st_phase (i)-mean_x_st;
    mean_x_st=alpha*del_x_st+mean_x_st;
    del_x_st2=(1-alpha)*del_x_st^2;
    del_var_x_st=del_x_st2-var_x_st;
    var_x_st=alpha*del_var_x_st+var_x_st;
    st_phase_sigma3=[st_phase_sigma3;
        10*log10(var_x_st/2)];
end
```

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the system may be varied substantially without departing from the spirit of the invention, and the exclusive use of all modifications which are within the scope of the appended claims is reserved.

I claim:

1. A method of controlling a handoff in a cellular communication system based on a noise/interference ratio in the cellular communication system, comprising the steps of:

(a) calculating a phase differential of a tone signal in a voice channel;

(b) calculating a phase deviation of the tone signal based on the phase differential of the tone signal;

(c) estimating the noise/interference ratio based on the phase deviation of the tone signal; and (d) initiating a handoff between a first communication channel and a second communication channel based on the estimated noise/interference ratio, thereby controlling the handoff between the first communication channel and the second communication channel based on the phase differential of a tone signal in the voice channel.

2. The method of claim 1, wherein the tone signal is a supervisory audio tone (SAT) signal.

3. The method of claim 1, wherein the tone signal is a signaling tone (ST) signal.

4. The method of claim 1, wherein the noise/interference ratio is a signal-to-noise ratio (SNR).

5. The method of claim 1, wherein the noise/interference ratio is a signal-to-interference ratio (SIR).

6. The method of claim 1, wherein the tone signal has a modulation index and the step of estimating the noise/interference ratio based on the phase deviation of the tone signal comprises the step of using the modulation index of the tone signal to estimate the noise/interference ratio.

7. A method of estimating a noise/interference ratio in a cellular communication system, comprising the steps of:

(a) calculating a phase differential of a tone signal in a voice channel;

(b) calculating a phase deviation of the tone signal based on the phase differential of the tone signal; and (c) estimating the noise/interference ratio based on the phase deviation of the tone signal, wherein the step of calculating the phase differential of the tone signal further comprises the steps of:

(i) determining a phase angle of the tone signal at a first and second time period;
(ii) unwrapping the phase angle; and
(iii) computing a phase difference between the phase angle at the first time period and the phase angle at the second time period.

8. The method of claim 7, wherein the step of determining the phase angle comprises performing an arctangent operation on sine and cosine correlators of the tone signal.

9. A method of estimating a noise/interference ratio in a cellular communication system, comprising the steps of:
  (a) calculating a phase differential of a tone signal in a voice channel;
  ((b) calculating a phase deviation of the tone signal based on the phase differential of the tone signal; and
  (c) estimating the noise/interference ratio based on the phase deviation of the tone signal,
  wherein the step of calculating the phase deviation of the tone signal is implemented by a two-stage autoregressive filter.

10. The method of claim 9, wherein auto-regressive filter comprises a residual phase filter and a residual phase deviation filter.

11. A method of estimating a noise/interference ratio in a cellular communication system, comprising the steps of:
  (a) calculating a phase differential of a tone signal in a voice channel;
  (b) calculating a phase deviation of the tone signal; and
  (c) estimating the noise/interference ratio based on the phase deviation of the tone signal,
  wherein the step of calculating the phase deviation of the tone signal further comprises the steps of:
    (i) weighing a previous estimate of a phase mean;
    (ii) weighing a current value of the phase differential; and
    (iii) calculating a new estimate of the phase mean based on the weighted values.

12. The method of claim 11, wherein the previous estimate of the phase mean is weighted by a constant ($\alpha$).

13. The method of claim 12, wherein the current value of the phase differential is weighted by $1-\alpha$.

14. The method of claim 13, wherein the constant $\alpha$ is a power of 2.

15. An apparatus for calculating the residual phase deviation of a tone signal in an analog voice channel, comprising:
  means for determining a phase differential of the tone signal; and
  a two-stage autoregressive filter coupled to the output of the phase differential determining means,
    wherein the autoregressive filter calculates a residual phase deviation of the tone signal by weighing a current value of the phase differential and a previous estimate of a phase mean, and
    wherein the residual phase deviation is used to estimate a noise/interference ratio.

16. The apparatus of claim 15, wherein the phase differential determining means comprises an arctangent operator and a phase unwrap and differencer.

17. The apparatus of claim 15, wherein the two-stage autoregressive filter comprises a residual phase filter and a residual phase deviation filter.

18. The apparatus of claim 17, wherein the residual phase deviation filter weights the previous estimate of the phase mean by a constant ($\alpha$).

19. The apparatus of claim 18, wherein the residual phase filter weights the value of the current phase differential by $1-\alpha$.

20. The apparatus of claim 19, wherein the constant $\alpha$ is a power of 2.

21. The apparatus of claim 15, wherein the tone signal is a supervisory audio tone (SAT) signal.

22. The apparatus of claim 15, wherein the tone signal is a signaling tone (ST) signal.

23. The apparatus of claim 15, wherein the noise/interference ratio is a signal-to-noise ratio (SNR).

24. The apparatus of claim 15, wherein the noise/interference ratio is a signal-to-interference ratio (SIR).

* * * * *

UNITED STATES PATENT AND TRADEMARK OFFICE
CERTIFICATE OF CORRECTION

PATENT NO. : 6,128,494

DATED : October 3, 2000

INVENTOR(S): Jacob Rozmaryn

It is certified that error appears in the above-identified patent and that said Letters Patent are hereby corrected as shown below:

Figure 1, Element 34, please change Phase Unwrap And Defferencer to --Phase Unwrap And Ditterencer--

Signed and Sealed this

Twenty-fourth Day of April, 2001

Attest:

NICHOLAS P. GODICI

Attesting Officer

Acting Director of the United States Patent and Trademark Office